March 16, 1943.  H. H. RUGG ET AL  2,313,972
BUS STRUCTURE
Filed June 8, 1938    2 Sheets-Sheet 1
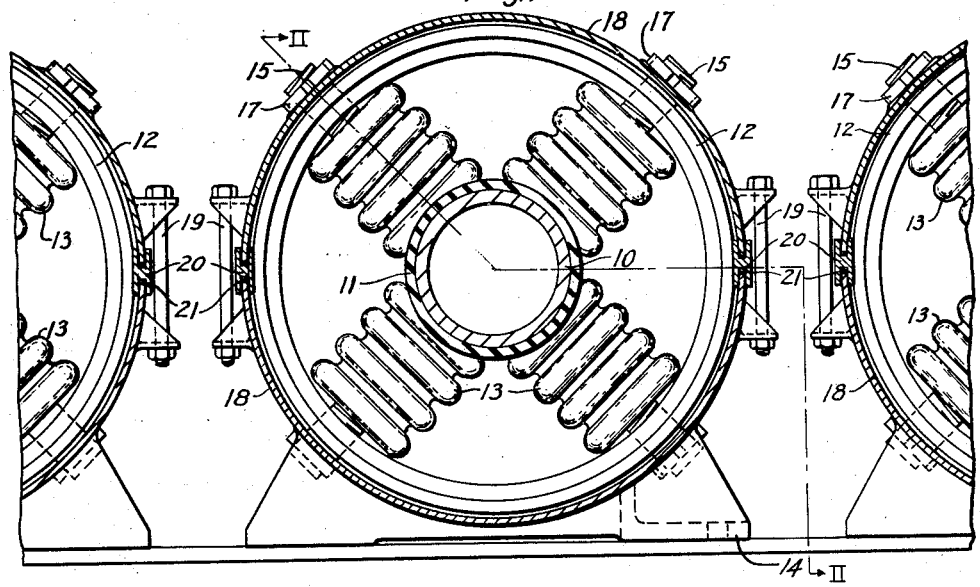
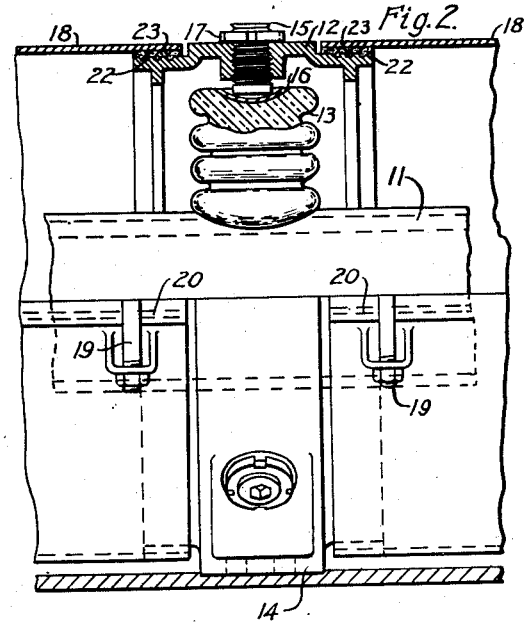
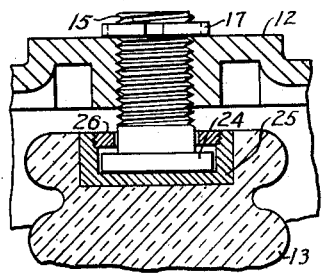
WITNESSES:
INVENTORS
Harold H. Rugg and
Paul R. Pierson.
ATTORNEY Patented Mar. 16, 1943

2,313,972

UNITED STATES PATENT OFFICE 2,313,972

BUS STRUCTURE

Harold H. Rugg and Paul R. Pierson, Wilkinsburg, Pa., assignors to Westinghouse Electric & Manufacturing Company, East Pittsburgh, Pa., a corporation of Pennsylvania Application June 8, 1938, Serial No. 212,440

2 Claims. (Cl. 174—148)

Our invention relates, generally, to electrical bus structures and, more particularly, to bus structures of the metal-enclosed, segregated phase type.

An object of our invention, generally stated, is to provide an electrical bus structure which shall be efficient in operation and which may be readily and economically manufactured and installed.

A more specific object of our invention is to provide a bus structure which shall be suitable for conducting relatively large amounts of current at relatively high voltages.

Another object of our invention is to provide for rigidly supporting a tubular electrical conductor.

A further object of our invention is to provide an adjustable insulating support for an electrical conductor.

Still another object of our invention is to provide an insulating support for an electrical conductor into which the conductor may be inserted or from which it may be removed readily.

A still further object of our invention is to provide a removable metal enclosure for an electrical conductor which may be readily secured in position around the conductor.

Another object of our invention is to provide an insulating baffle for an enclosed bus bar structure.

Other objects of our invention will be explained fully hereinafter or will be apparent to those skilled in the art.

In accordance with one embodiment of our invention, an insulated tubular conductor is supported inside of a supporting ring by means of four equally spaced insulators, which may be adjusted by adjusting screws in the supporting ring. The supporting ring is provided with feet for attaching it to a framework in the station. The supporting rings may be spaced at predetermined distances and the bus conductors protected between supports by a removable metal cover, which is sealed at its joints. A sectional insulating baffle plate may be utilized at desired locations in the bus structure to prevent the circulation of gases.

For a fuller understanding of the nature and objects of the invention, reference may be had to the following detailed description, taken in conjunction with the accompanying drawings, in which:

Figure 1 is a view, partially in end elevation and partially in section of a bus structure embodying our invention;

Fig. 2 is a view, partially in elevation and partially in section, taken along the line II—II of Fig. 1;

Fig. 3 is an enlarged view, in section, of a modified form of one of the insulating supports utilized in the bus structure;

Figure 4:
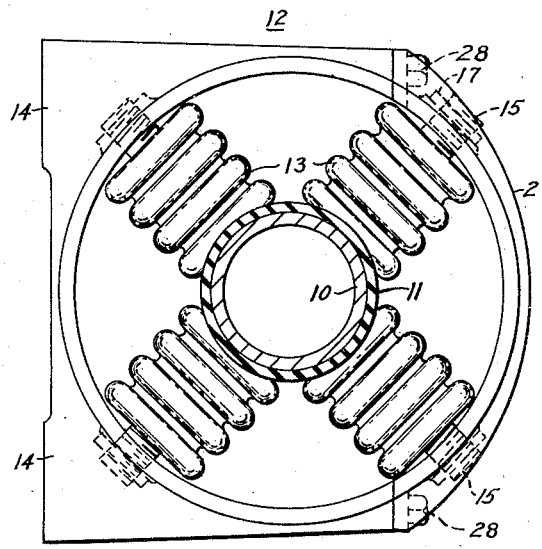
Fig. 4 is a view, partly in end elevation and partly in section of a modified form of the bus support utilized in the bus structure.

Referring to the drawings, and particularly to Fig. 1, the portion of the bus structure shown in the central part of the figure comprises a tubular conductor 10, which may be covered with a suitable insulating material 11, a ring 12 and four insulators 13, which may be equally spaced inside the ring 12 to support the conductor 10. The insulators 13 may be composed of procelain, or other suitable insulating material, and the ends which support the conductor 10 are shaped to conform generally to the outside shape of the conductor. The ring 12 is provided with feet 14 for attaching the rings to a suitable framework (not shown) in the power station.

In order that the conductor 10 may be held securely in position and withstand the stresses imposed by the flow of relatively high values of current, an adjusting screw 15 is provided for individually adjusting each one of the insulators 13. As shown in Fig. 2, the adjusting screws 15 are threaded through the ring 12, and may be adjusted to force the insulators 13 tightly against the conductor 10. A disc 16, composed of soft metal is provided in the top of each one of the insulators to protect the porcelain from injury by the end of the adjusting screw 15. Lock nuts 17 are provided for locking the screws 15 after the insulators 13 are properly adjusted.

When it is desired to remove the conductor 10 from the support, the screws 15 may be loosened sufficiently to permit the conductor to be withdrawn through the ring 15. The structure may be assembled in a similar manner by inserting the conductor through the ring, placing the insulators 13 in position and turning the screws 15 to tighten the insulators against the conductor.

In order to facilitate the assembly or disassembly of the structure, particularly when three phase bus structures are provided, in which case three conductors may be placed relatively close together as shown in Fig. 1, the insulators 13 are disposed at approximately an angle of 45° from the vertical and horizontal planes through the conductors, thereby placing the screws 15 in a position where they are readily accessible without conflicting with the adjacent bus supports.

It will be understood that the supporting rings 12 may be positioned in spaced relation along the conductors 10, to provide adequate support for the conductors. In order to provide additional protection for the conductors, they are enclosed by a casing 18, which extends between the supporting rings 12. As shown, the casing 18 is divided longitudinally into two sections which are clamped together by bolts 19, thereby facilitating the assembly of the casing around the conductor.

With a view to making the housing for each bus conductor substantially air-tight, H-bars 20 are provided for the longitudinal seams between the two sections of the casing 18. A suitable packing material 21 may be placed in the bottom of the slots in the H-bars for sealing the joint when the two sections of the casing 18 are drawn together by the bolts 19. As shown in Fig. 2, the rims of each supporting ring 12, which are overlapped by the ends of the casing 18, are provided with one or more grooves 22 into which packing material 23 is placed for more effectively sealing the joint between the casing 18 and the rings 12. In this manner, the conductor 10 is completely enclosed by the supporting rings 12 and the casing 18, which extends between the supporting rings.

As shown in Fig. 3, the insulators 13 may be loosely mounted on the adjusting screws 15 in such a manner that they will not drop out of the supporting ring 12 when the conductor 10 is not in position in the ring. In this case, one end of each screw 15 is provided with a shoulder 24, which is disposed in a metal cup or insert 25 that may be cemented or otherwise secured in the end of the insulator 13. The insulator is retained on the screw 15 by a washer 26, which is threaded into the metal insert 25 to prevent the shoulder 24 from being withdrawn from the insert 25. The insulator may be tightened against the conductor 10 in the same manner as described hereinbefore by turning the screw 15 in the ring 12 and locking it with the nut 17.

Figure 5:
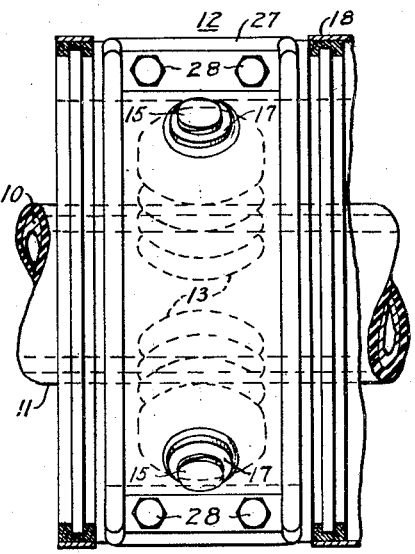
Fig. 5 is a view, in side elevation, of the bus support shown in Fig. 4.

In the modification of the invention illustrated in Figs. 4 and 5, a segment 27 of the supporting ring 12 may be removed in order that the conductor 10 may be inserted in the ring from the side instead of being inserted endwise through the ring, as in the structure illustrated in Fig. 1. The segment 27 is held in position by stud bolts 28, which are threaded into the main portion of the supporting ring 12.

As shown, the feet 14 for the supporting ring are on the side of the ring opposite the segment 27, which permits the three conductors of a three-phase system to be mounted in a vertical plane on the side of a wall or other vertical structure, if desired. However, it will be understood that the structure illustrated in Figs. 4 and 5 may be mounted on a horizontal framework, as illustrated in Fig. 1, by simply rotating the rings through an angle of 90°.

The insulators 13 utilized with the structure shown in Figs. 4 and 5 are preferably of the type shown in Fig. 3, in which the insulators are loosely secured to the adjusting screws 15 to prevent them from falling out of the ring 12 when the conductor 10 is removed from the supporting rings. As shown, two of the insulators 13 may be mounted on the removable segment 27 to permit them to be removed with the segment, thereby facilitating the assembly of the conductor 10 in the bus structure.

It will be seen that the structure may be readily assembled by securing the rings 12 to the supporting wall or framework by means of the feet 14 and placing the two insulators, which are mounted on the main portion of the supporting ring, in position. The conductor 10 is then placed in the ring and the removable segment 27 with the other two insulators attached to the main portion of the ring 12 by means of the bolts 28, after which the adjusting screws 15 may be adjusted to tighten the insulators against the conductor 10, as hereinbefore described. In the event that it is desired to remove the conductor, this may be done by simply removing the segment 27 and the pair of insulators carried by this segment.

It will be seen that the structure illustrated in Figs. 4 and 5 is particularly advantageous where relatively long sections of the conductors 10 are utilized which require several of the supporting rings to support one length of conductor, since the conductor may be placed in all of the supporting rings simultaneously from the side of the rings instead of being inserted endwise through the rings. Likewise, the removable segment facilitates the mounting of conductors which have been previously assembled in right angle and T relations. Furthermore, the use of insulators of the type shown in Fig. 3, which are retained in the rings by the adjusting screws 15, facilitates the assembly of the structure.

Figure 6:
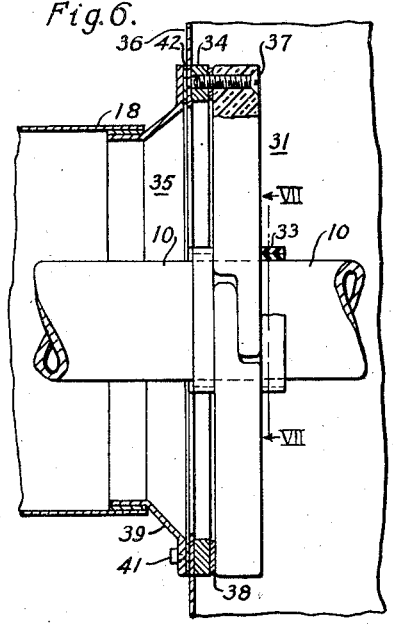
Fig. 6 is a view, partially in side elevation and partially in section, of a baffle plate utilized in the bus structure; and, Fig. 7 is a view, partially in end elevation and partially in section of the baffle plate shown in Fig. 6.
Figure 7:
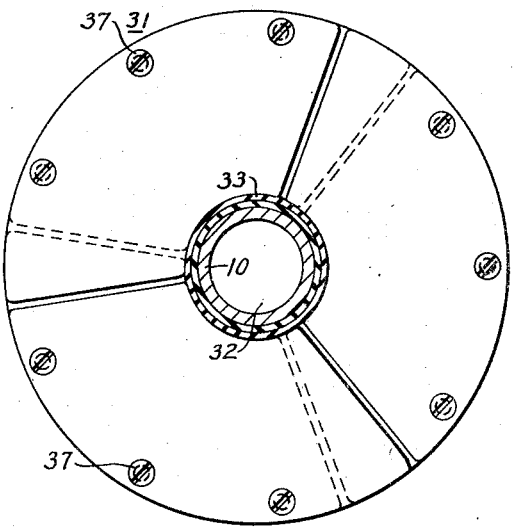

In order to prevent the circulation of gases, which may be formed in a switch or breaker compartment to which the bus structure is attached by arcs resulting from the interrupting of power circuits, an insulating baffle plate 31 of the type illustrated in Figs. 6 and 7 may be utilized to close the openings through which the conductors 10 enter the compartment.

As illustrated in Figs. 6 and 7, the baffle plate 31 may be composed of porcelain or other suitable insulating material, and it is divided into three equal sections of 120° each. The edges of the three sections overlap in the manner shown to prevent the escape of gases through the joints between the sections.

The circular opening 32 is provided at the center of the baffle plate for the conductor 10. The opening 32 may be sealed, after the baffle plate is assembled on the conductor, by means of insulating tape 33, which may be applied to the conductor on each side of the baffle plate, as shown in Fig. 6.

The three sections of the baffle plate may be secured to a ring 34, which surrounds the opening 35 in a wall 36 of the switch compartment, by means of a plurality of screws 37, which may be countersunk into the baffle plate 31. The ring 34 may be secured to the inside of the wall 36 by welding, or other suitable means. A gasket 38 may be placed between the ring 34 and the baffle plate 31 to seal more effectively the joint between the ring 34 and the plate.

As shown in Fig. 6, a flanged ring 39 may be bolted onto the outside of the wall 36 by means of stud bolts 41 to support the end of the casing 18, which encloses the conductor 10 in the manner hereinbefore described. A gasket 42 may also be placed between the ring 39 and the wall 36 of the switch housing.

In this manner, a baffle plate is provided which may be constructed of porcelain, which is one of the best insulating materials known, and which may be readily assembled on a circular conductor at any point in the bus structure where it is desired to prevent the circulation of gases through the structure. Furthermore, the baffle plate also functions as an insulating support for the conductor, thereby strengthening the structure.

From the foregoing description, it is apparent that we have provided a bus structure which is suitable for heavy duty service; that is, for the transmission of relatively large amounts of current at relatively high voltages. Furthermore, we have provided a means of securely retaining an insulated circular conductor in position by means of insulating supports, in which all metal parts are a sufficient distance from the power conductor to prevent danger of breakdown of the insulation. The structure may be readily assembled with the power conductors disposed in either vertical or horizontal planes and with the conductors placed relatively close together, when necessary.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. A support for a conductor comprising, a supporting ring, spaced insulating members mounted inside the ring for supporting the conductor, and means for adjusting said insulating members in the supporting ring, said insulating members being rotatably attached to said adjusting means, a segment of said ring being removable therefrom.

2. A support for a conductor, comprising, a supporting ring having a removable segment, spaced insulating members mounted inside the ring for supporting the conductor, and means for adjusting said insulating members in the supporting ring, said insulating members being rotatably attached to said adjusting means, part of said insulating members being removable along with the removable segment of the ring.

HAROLD H. RUGG.
PAUL R. PIERSON.